United States Patent
Nagayasu et al.

(10) Patent No.: US 8,557,879 B2
(45) Date of Patent: Oct. 15, 2013

(54) PROCESS FOR PRODUCTION OF ACTIVATED FISCHER-TROPSCH SYNTHESIS CATALYST, AND PROCESS FOR PRODUCTION OF HYDROCARBON

(75) Inventors: Yoshiyuki Nagayasu, Tokyo (JP); Kazuaki Hayasaka, Tokyo (JP); Hideki Ono, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/580,239

(22) PCT Filed: Jan. 6, 2011

(86) PCT No.: PCT/JP2011/050126
§ 371 (c)(1),
(2), (4) Date: Oct. 26, 2012

(87) PCT Pub. No.: WO2011/105118
PCT Pub. Date: Sep. 1, 2011

(65) Prior Publication Data
US 2013/0041052 A1   Feb. 14, 2013

(30) Foreign Application Priority Data

Feb. 26, 2010  (JP) ................ P2010-043003

(51) Int. Cl.
*C07C 27/00* (2006.01)
*B01J 20/34* (2006.01)

(52) U.S. Cl.
USPC ............. 518/700; 502/20; 502/34

(58) Field of Classification Search
USPC ................ 502/20, 34; 518/700
See application file for complete search history.

(56) References Cited

U.S. PATENT DOCUMENTS

| | | |
|---|---|---|
| 4,499,209 A | 2/1985 | Hoek et al. |
| 6,509,382 B1 * | 1/2003 | Ducreux et al. ............. 518/709 |

FOREIGN PATENT DOCUMENTS

| | | |
|---|---|---|
| JP | 59-102440 | 6/1984 |
| JP | 61-26693 | 2/1986 |
| JP | 4-227847 | 8/1992 |
| JP | 2003-535677 | 12/2003 |
| JP | 2006-506224 | 2/2006 |
| JP | 2007-84601 | 4/2007 |
| JP | 2008-540114 | 11/2008 |

OTHER PUBLICATIONS

Search Report issued with respect to PCT/JP2011/050126, mailed Apr. 19, 2011.
International Preliminary Report on Patentability issued with respect to PCT/JP2011/050126, mailed Sep. 27, 2012.
Bian et al., "Studies with a precipitated iron Fischer-Tropsch catalyst reduced by $H_2$ or CO", Journal of Molecular Catalysis A: Chemical, vol. 186, No. 1-2, Jul. 22, 2002, pp. 2003-2213.

* cited by examiner

*Primary Examiner* — Jafar Parsa
(74) *Attorney, Agent, or Firm* — Greenblum & Bernstein, P.L.C.

(57) ABSTRACT

A method for producing an activated Fischer-Tropsch synthesis catalyst comprising a hydrogen reduction step of subjecting a catalyst comprising 3 parts by mass to 50 parts by mass, as a metal atom, of a cobalt compound and/or a ruthenium compound, based on 100 parts by mass of a carrier containing a porous inorganic oxide, supported on the carrier, to reduction in a gas containing molecular hydrogen at a temperature of 300° C. to 600° C.; and a CO reduction step of subjecting the catalyst to reduction in a gas containing carbon monoxide and containing no molecular hydrogen at a temperature of 200° C. to 400° C.

10 Claims, No Drawings

PROCESS FOR PRODUCTION OF ACTIVATED FISCHER-TROPSCH SYNTHESIS CATALYST, AND PROCESS FOR PRODUCTION OF HYDROCARBON

TECHNICAL FIELD

The present invention relates to a method for producing an activated catalyst used for the Fischer-Tropsch synthesis reaction, and a method for producing hydrocarbons.

BACKGROUND ART

In recent years, regarding a liquid fuel such as gasoline and gas oil, the control of a sulfur content and an aromatic hydrocarbon content has become rapidly stringent. Therefore, it has become essential to produce a clean liquid fuel having low sulfur and aromatic hydrocarbon contents and being so-called friendly to the environment. Examples of the method for producing such a clean fuel include a method of utilizing so-called Fischer-Tropsch synthesis reaction (hereinbelow, may also be referred to as "FT synthesis reaction") for reducing carbon monoxide with hydrogen (hereinbelow, may also be referred to as "FT synthesis method"). By the FT synthesis method, not only can be produced a liquid fuel base stock rich in a paraffin hydrocarbon and containing no sulfur, but also can be produced a wax (hereinbelow, may also be referred to as "FT wax") simultaneously. Then, the FT wax can be converted into a middle distillate (a fuel base stock such as kerosene and gas oil) by hydrocracking.

As the catalyst used for the FT synthesis method (hereinbelow, may also be referred to as "FT synthesis catalyst"), a catalyst in which an active metal such as iron, cobalt, and ruthenium is supported on a porous inorganic carrier such as silica and alumina is generally used (for example, see Patent Literature 1). In addition, with respect to the FT synthesis catalyst, it is reported that by using the above active metal in combination with a second component metal compound, the catalyst performance is enhanced (for example, see Patent Literatures 2 and 3). Examples of the second component metal include sodium, magnesium, lithium, zirconium, and hafnium, which are used as required in accordance with the intended use such as enhancing the inversion rate of carbon monoxide or increasing the chain growth probability, an indicator of a wax generated amount.

The FT synthesis catalyst is generally produced by supporting a metal compound containing an active metal component on a carrier, in which a metal component as a second component is supported on a porous inorganic oxide, and calcining this carrier product to convert the active metal component into an oxide. Further, by reducing the above-mentioned catalyst, the active metal component is converted from the oxide into a metal, thereby obtaining an FT synthesis catalyst (hereinbelow, may also be referred to as "activated FT synthesis catalyst") having high activity, and this FT synthesis catalyst is used in the FT synthesis reaction. In a known method for activating a cobalt catalyst, which is a typical FT synthesis catalyst, that is, in reduction of a cobalt catalyst in a stream of a hydrogen gas or a gas containing hydrogen, $Co_3O_4$, which is a cobalt species generated on the carrier by calcining, is finally reduced to Co (metal Co) via CoO. In addition, in the case of a ruthenium catalyst, RuO is reduced to Ru.

Note that generally, an FT synthesis catalyst is subjected to a reduction treatment in an apparatus attached to a catalyst producing facility, and thereafter, the outer surface of the catalyst is coated with a wax or the like, or an FT synthesis catalyst is ordinarily subjected to a stabilization treatment by lightly oxidizing the outer surface thereof and then transported to a hydrocarbon producing facility in which the FT synthesis method is performed, in order not to cause a decrease in activity of the catalyst by a contact of the catalyst with air during the transport or the like of the catalyst. In this description, the term "activated FT synthesis catalyst" encompasses catalysts subjected to the above-mentioned stabilization treatment.

CITATION LIST

Patent Literature

Patent Literature 1: Japanese Patent Application Laid-Open No. 04-227847
Patent Literature 2: Japanese Patent Application Laid-Open No. 59-102440
Patent Literature 3: Japanese Patent Application Laid-Open No. 2007-84601

SUMMARY OF INVENTION

Technical Problem

However, when a hydrocarbon is produced by the FT synthesis method using an activated FT synthesis catalyst activated by the above-mentioned conventional method, the catalyst often has low activity particularly in the initial stage of the reaction. Therefore, when the FT synthesis reaction is performed using an activated FT synthesis catalyst activated by a conventional activation method, particularly on a commercial scale, it is difficult to obtain a high yield of intended hydrocarbons from the initial stage of the reaction.

The present invention has been made in light of the problems associated with the conventional techniques, and an object of the present invention is to provide a method for producing an activated FT synthesis catalyst capable of exerting high activity from the initial stage of the FT synthesis reaction, and a method for producing hydrocarbons using an activated FT synthesis catalyst obtained by the method for producing an activated FT synthesis catalyst.

Solution to Problem

The present inventors have made extensive studies and examinations to accomplish the aforementioned object, and as a result, found that an activated FT synthesis catalyst obtained by reducing a catalyst having a specific composition through specific steps has high activity from the initial stage of the FT synthesis reaction, and have accomplished the present invention based on the findings.

That is, the present invention provides a method for producing an activated Fischer-Tropsch synthesis catalyst, the method comprising a hydrogen reduction step of subjecting a catalyst comprising 3 parts by mass to 50 parts by mass, as a metal atom, of a cobalt compound and/or a ruthenium compound, based on 100 parts by mass of a carrier containing a porous inorganic oxide, supported on the carrier, to reduction in a gas containing molecular hydrogen at a temperature of 300° C. to 600° C.; and a CO reduction step of subjecting the catalyst to reduction in a gas containing carbon monoxide and containing no molecular hydrogen at a temperature of 200° C. to 400° C.

In the method for producing an activated Fischer-Tropsch synthesis catalyst of the present invention, it is preferred to provide the CO reduction step after the hydrogen reduction step.

Further, it is preferred that the porous inorganic oxide be silica and/or alumina.

Also, a stabilization treatment step for stabilizing the activated catalyst may be further provided after both the hydrogen reduction step and the CO reduction step are performed.

Further, it is preferred that the reduction degree of cobalt atoms and/or ruthenium atoms in the activated Fischer-Tropsch synthesis catalyst be 70 mol % to 95 mol %. Here, the activated Fischer-Tropsch synthesis catalyst subjected to measurement of the reduction degree is a catalyst that has undergone both the hydrogen reduction step and the CO reduction step, and when a stabilization treatment step is further performed, it is a catalyst that has undergone the stabilization treatment step.

Note that in the present invention, the reduction degree of the cobalt atoms and/or ruthenium atoms means a ratio (mol %) of metallic cobalt (Co (0)) and/or metallic ruthenium (Ru (0)) relative to the total cobalt atoms and/or ruthenium atoms contained in the activated FT synthesis catalyst. Note that, here, as the value of the reduction degree, a value determined by using a TPR (Temperature Programmed Reduction) measurement device is employed. The details of the measurement will be described hereinafter.

Also, it is preferred that the carrier containing the porous inorganic oxide further contain zirconium.

Furthermore, the present invention provides a method for producing hydrocarbons in which a feedstock containing carbon monoxide and a hydrogen gas is subjected to Fischer-Tropsch synthesis reaction in the presence of an activated Fischer-Tropsch synthesis catalyst produced by the aforementioned method.

Advantageous Effects of Invention

When the FT synthesis reaction is performed using an activated Fischer-Tropsch synthesis catalyst obtained by the production method of the present invention, the catalyst exerts high activity from the initial stage of the reaction, and thus it is possible to efficiently obtain hydrocarbons with a high yield.

DESCRIPTION OF EMBODIMENTS

Hereinafter, the present invention will be described in detail in accordance with preferred exemplary embodiments.

A porous inorganic oxide used as a carrier according to the production method of the present invention is not particularly limited, examples thereof include silica, alumina, titanium and magnesia, and preferred are silica or alumina, with silica being particularly preferred. Further, properties of the porous inorganic oxide are not particularly limited, however, the specific surface area of the porous inorganic oxide measured by a nitrogen adsorption method is preferably 50 m$^2$/g to 800 m$^2$/g, and more preferably 150 m$^2$/g to 500 m$^2$/g. In addition, the average pore diameter of the porous inorganic oxide measured by the nitrogen adsorption method is preferably 6 nm to 40 nm, and more preferably 10 nm to 20 nm. Further, the shape of the porous inorganic oxide is not also particularly limited, however, in view of the practicability, preferred are spherical shapes, cylindrical shapes, and cylindrical shapes having irregular shape cross-sections such as a three-leaf shape and a four-leaf shape and the like, which are generally used in apparatuses for petroleum refining and petrochemical industry. In addition, the particle diameter of the porous inorganic oxide is not also particularly limited, however, from the practicability perspective, it is preferably 10 μm to 10 mm.

It is preferred that the carrier containing the porous inorganic oxide according to the production method of the present invention further contain zirconium. By inclusion of the porous inorganic oxide contains zirconium in the carrier, it is possible to suppress a decrease in activity with time of the activated Fischer-Tropsch synthesis catalyst containing the carrier during the reaction. It is preferred that zirconium be supported on the porous inorganic oxide in a state of zirconium oxide. Further, it is preferred that this zirconium oxide be supported at a high concentration in the proximity of the surface of the porous inorganic oxide.

The carrier composed of the porous inorganic oxide which contains zirconium in the state described above can be produced, for example, by the following methods. That is, first, a porous inorganic oxide is pretreated with an aqueous solution having a pH value of 7 or less. Examples of the aqueous solution having a pH value of 7 or less used at this time include a nitric acid aqueous solution, an acetic acid aqueous solution, a sulfuric acid aqueous solution, hydrochloric acid aqueous solution, ion exchanged water, and distilled water. The pH value is preferably 5 to 7, and more preferably 6 to 7. When the pH value is lower than 5, it is not economically preferred because in order to support a zirconium compound in a necessary amount in the supporting of a zirconium compound performed after the pretreatment, there is a need to increase the concentration of the used zirconium compound solution. The pretreatment can be performed, for example, by adding an aqueous solution having a pH value of 7 or less in a container in which the porous inorganic oxide is charged. The time for immersing the porous inorganic oxide in the aqueous solution having a pH value of 7 or less is, in the case of leaving the aqueous solution at rest, preferably about 10 hours to about 72 hours, in the case of applying vibration to the aqueous solution, preferably about 1 hour to about 12 hours, and in the case of irradiating the aqueous solution with a supersonic wave, preferably about 1 minute to about 30 minutes.

After the pretreatment is performed, an excessive amount of the solution containing a zirconium compound is added into a container, in which the porous inorganic oxide that has been subjected to the pretreatment is contained, to impregnate the porous inorganic oxide with the solution, and thereby the zirconium compound can be supported on the porous inorganic oxide. At this time, it is preferred to preliminarily remove a supernatant liquid of the aqueous solution after the pretreatment, because the container required can be reduced in size. Note that the so-called excessive amount means a volume amount which is two times or more the volume constituted by the porous inorganic oxide. Examples of the usable zirconium compound include zirconium sulfate, zirconium acetate, ammonium zirconium carbonate, and zirconium trichloride, and among these, ammonium zirconium carbonate and zirconium acetate are preferred.

The amount of zirconium to be supported as a zirconium atom is preferably 40 parts by mass or less, and more preferably 1 part by mass to 30 parts by mass, based on 100 parts by mass of the porous inorganic oxide. When the supporting amount is more than 40 parts by mass, there is a tendency that zirconium cannot be selectively supported in the proximity of the outer surface of the porous inorganic oxide. Although the time for supporting the zirconium compound on the porous inorganic oxide depends on the supporting amount, it is usually 3 hours to 72 hours.

After the supporting of the zirconium compound, the solution and the carrier (the porous inorganic oxide supporting the zirconium compound) are separated from each other, and then the carrier is dried. The drying method is not particularly limited, and examples thereof include drying by heating in the air, and deaeration drying under reduced pressure. Ordinarily, the drying is performed at a temperature of 100° C. to 200° C., preferably at 110° C. to 130° C. for 2 hours to 24 hours, preferably for 5 hours to 12 hours.

After the drying, the carrier is calcined to convert the zirconium compound into an oxide. Although the calcining method is not particularly limited, the calcining can ordinarily be performed at 340° C. to 600° C., preferably at 400° C. to 450° C., in an air atmosphere for 1 hour to 5 hours.

Thus, a carrier in which a zirconium oxide is selectively supported in the proximity of the outer surface of a porous inorganic oxide can be obtained.

Next, on the carrier containing zirconium, cobalt and/or ruthenium being active metals are supported. Ordinary examples of the active metals used in FT synthesis catalysts include ruthenium, cobalt, and iron, however, as an active metal according to the catalyst production method of the present invention, in order to make the most of properties of zirconium, which is a second metal component, preferred are cobalt or ruthenium, or a combination of cobalt with ruthenium. Although a cobalt compound and/or a ruthenium compound used for supporting cobalt and/or ruthenium is or are not particularly limited, salts or complexes of these metals can be used. Specific examples thereof include nitrate, hydrochloride, formate, propionate, and acetate. Although the supporting amount of cobalt and/or ruthenium relative to the amount of the carrier is not particularly limited, generally, as a metal atom, cobalt and/or ruthenium in an amount of 3 parts by mass to 50 parts by mass, and preferably in an amount of 10 parts by mass to 30 parts by mass can be supported based on the mass, 100 parts by mass of the carrier. When the supporting amount is less than 3 parts by mass, the activity of the catalyst tends to become insufficient, whereas when the supporting amount is more than 50 parts by mass, an aggregation of the metal easily occurs and thus the value of practical use as the FT synthesis catalyst tends to decrease. The method of supporting the cobalt compound and/or the ruthenium compound is not particularly limited, and an impregnation method typified by the Incipient Wetness method can be used.

After the cobalt compound and/or the ruthenium compound is supported on the carrier, the carrier is dried usually at a temperature of 100° C. to 200° C., preferably at 110° C. to 130° C. for 2 hours to 24 hours, preferably for 5 hours to 10 hours.

After the drying, the carrier on which the compound containing the active metal is supported is calcined in an air atmosphere at 340° C. to 600° C., preferably at 400° C. to 450° C. for 1 hour to 5 hours to convert the compound containing the active metal into an oxide, i.e., into a cobalt oxide and/or a ruthenium oxide. Thus, the FT synthesis catalyst can be obtained.

The above-mentioned FT synthesis catalyst may be directly used in the FT synthesis reaction, however, generally, if it is used in its natural state, the activity to the FT synthesis reaction is low. For this reason, generally, the catalyst is used in the FT synthesis reaction after the catalyst is reduced to convert an active metal species from an oxide into a metal for activating and to be formed as an activated FT synthesis catalyst.

In a conventional method for obtaining an activated FT synthesis catalyst, reduction of a catalyst is generally performed in a gas containing molecular hydrogen typified by hydrogen gas. However, in this case, a high reduction degree cannot be obtained due to insufficient reduction of an active metal, and the activity of the obtained activated FT synthesis catalyst is not sufficient. In reduction of a catalyst particularly in an apparatus on a commercial scale, this tendency is conspicuous. The present inventors assume that the insufficient activity of the obtained activated FT synthesis catalyst is caused because when the active metal species is reduced from a state of an oxide to a state of a metal by the action of molecular hydrogen, water is generated and the water inhibits the reduction of the active metal species.

In the production method of the present invention, the most characteristic point is that when an FT synthesis catalyst is reduced to obtain an activated FT synthesis catalyst, the production method comprises a hydrogen reduction step of performing a reduction in a gas containing molecular hydrogen; and a CO reduction step of performing a reduction in a gas containing carbon monoxide and containing no molecular hydrogen. Particularly, it is preferred to provide the CO reduction step after the hydrogen reduction step. By performing the reduction of a catalyst through such steps, a high reduction degree, which is difficult to attain with conventional methods of performing reduction only in a gas containing molecular hydrogen, can be obtained without considerably causing an active metal to aggregate.

The gas containing molecular hydrogen used in the hydrogen reduction step according to the production method of the present invention is not particularly limited as long as it contains molecular hydrogen (a hydrogen gas), and examples thereof include a hydrogen gas, a gas mixture of a hydrogen gas with an inert gas such as a nitrogen gas, with the hydrogen gas being preferable. Note that if the gas containing molecular hydrogen contains carbon monoxide, it is not preferable because the FT synthesis reaction is induced during the reduction treatment and there is a concern about an increase in temperature, and the like, however, inclusion of a small amount of carbon monoxide is allowable.

The temperature employed in the hydrogen reduction step is 300° C. to 600° C., and preferably 350° C. to 500° C. When the temperature is lower than 300° C., it tends to be difficult to efficiently obtain a necessary reduction degree of an active metal species. Meanwhile, when the temperature is higher than 600° C., an aggregation of the active metal is progressed, and the activity of the catalyst tends to lower.

Since the treatment time in the hydrogen reduction step is determined in view of the temperature employed and also depends on the configuration of the apparatus used, it is not completely limited, however, it is generally 1 hour to 60 hours.

In the production method of the present invention, the catalyst needs to be used not only in the hydrogen reduction step but also used in the CO reduction step of performing a reduction in a gas containing carbon monoxide and containing no molecular hydrogen. Also, it is preferred that the catalyst be reduced through the hydrogen reduction step first and then be further reduced in the CO reduction step.

The gas containing carbon monoxide and containing no molecular hydrogen used in the CO reduction step is not particularly limited, and examples thereof include a carbon monoxide gas, and a gas mixture of carbon monoxide with an inert gas such as a nitrogen gas, with the carbon monoxide gas being preferable. Note that in the gas containing carbon monoxide and containing no molecular hydrogen, inclusion of a small amount of a hydrogen gas is allowable.

The temperature employed in the CO reduction step is 200° C. to 400° C., and preferably 280° C. to 350° C. When the temperature is lower than 200° C., it tends to be difficult to obtain a sufficient reduction degree of the active metal. Meanwhile, when the temperature is higher than 400° C., carbons typified by carbon nanotube tend to be generated from the carbon monoxide.

When the thus obtained activated FT synthesis catalyst is contacted with air, there is a concern that the activity lowers due to oxidation of the active metal. Hence, when an activated catalyst is contacted with air, such as transport of a catalyst particularly in the case where the location of a facility for producing a catalyst and the location of a facility for performing the FT synthesis reaction using the catalyst are away from each other, the transport or the like of the activated FT synthesis catalyst is performed after the catalyst is subjected to a stabilization treatment in order not to cause a decrease in activity thereof even when the activated FT synthesis catalyst obtained through reduction is in contact with air during the transport. As specific methods for the stabilization treatment, a method of coating the outer surface of an activated FT synthesis catalyst with a wax or the like to cut off contact with air, a method of lightly oxidizing the outer surface of an activated FT synthesis catalyst to form an oxide layer to prevent further progression of oxidization by the contact with air, and the like are generally employed.

When the method of lightly oxidizing the outer surface of an activated FT synthesis catalyst is employed in the stabilization treatment, the reduction degree of the active metal atoms slightly lowers, and the initial activity of the stabilized activated FT synthesis catalyst to the FT synthesis reaction also slightly lowers, as compared to the activated FT synthesis catalyst before being subjected to the stabilization treatment. However, since a catalyst subjected to a stabilization treatment can be used in the FT synthesis reaction without performing activation by reduction again, the activated FT synthesis catalyst also encompasses catalysts in this form.

The reduction degree of cobalt atoms and/or ruthenium atoms contained in the activated FT synthesis catalyst obtained by the production method of the present invention is preferably 70 mol % to 95 mol %. When the reduction degree is lower than 70 mol %, the activity of the catalyst tends to be low. Meanwhile, if the reduction is performed so that the reduction degree exceeds 95 mol %, it is not effective because a remarkably high temperature or a long time is necessary, and in the catalyst that has been subjected to reduction under such a condition, the active metal aggregates, and the activity tends to lower. In the production method of the present invention, conditions for the reduction temperature, the reduction time and the like in each of the hydrogen reduction step and the CO reduction step can be selected from various combinations thereof. Also, depending on the apparatus used in these reduction steps, these conditions are changed. By using the reduction degree as an indicator, suitable conditions therefor can be selected.

Note that the reduction degree of the active metal atoms contained in the catalyst is measured by using a TPR measurement apparatus as follows. First, as a standard sample, an unreduced (an active metal is in a state of an oxide) catalyst (reduction degree: 0 mol %) is subjected to a TPR measurement in a TPR measurement apparatus to measure the value of MASS18 ($H_2O$). When the catalyst to be measured is an activated FT synthesis catalyst that has been subjected to a stabilization treatment, a sample of the catalyst is subjected to a TPR measurement by a TPR measurement apparatus under the same conditions as used in the unreduced catalyst to measure the value of MASS18. Then, from the ratio of this value of MASS18 to the value of MASS18 of the above-mentioned unreduced catalyst, the reduction degree is calculated. Meanwhile, when an activated FT synthesis catalyst that is not subjected to a stabilization treatment is to be measured, first, a catalyst of an unreduced catalyst being a base is subjected to a reduction treatment in a TPR apparatus under corresponding reduction conditions, then, the apparatus is cooled to perform a TPR measurement. Then, the value of MASS18 is measured in the same manner as described above, and from the ratio of this value to the value of the standard, the reduction degree is calculated.

In the production method of the present invention, by effecting a catalyst to undergo the reduction by the hydrogen reduction step and the reduction by the CO reduction step, it is possible to suppress the aggregation of active metals contained in the obtained activated FT synthesis catalyst and to increase the reduction degree of the activated metal atom, and thus the initial reaction activity of the catalyst can be increased. This action mechanism is not clear, however, the present inventors consider as follows. In the case where a catalyst in which an active metal species is in a state of an oxide is reduced in a gas containing molecular hydrogen, it is conceivable that while the molecular hydrogen has a high reduction force, water is generated from the molecular hydrogen and the oxide of the active metal, and this generated water inhibits reduction of the active metal species, thereby preventing reaching a high reduction degree. Meanwhile, it is conceivable that in reduction through the use of carbon monoxide, no water is generated, and thus the inhibition of reduction of the active metal species does not occur. For this reason, the inventors consider that it is possible to efficiently obtain a high reduction degree by combining the reduction through the use of molecular hydrogen having a strong reduction force and the reduction through the use of carbon monoxide capable of removing the inhibition action.

The method of carrying out the FT synthesis reaction with use of carbon monoxide and a hydrogen gas as feedstock, using an activated FT synthesis catalyst obtained by the production method of the present invention is not particularly limited, and known methods can be employed. As a reactor, a fixed bed reactor or a slurry fluidized-bed reactor is preferred. In addition, it is preferred that the reaction be effected under the condition that the inversion rate of carbon monoxide as a feedstock is 50% or higher, and it is more preferred that the reaction be effected under the condition that the inversion rate is in the range of 70% to 90%.

Hereinafter, along an example using a slurry fluidized-bed type reactor, a synthesis method of hydrocarbons, using an activated FT synthesis catalyst produced by the method of the present invention will be described.

As the reactor, for example, a bubble column type fluidized-bed reaction apparatus can be used. In the bubble column type fluidized-bed reaction apparatus, a slurry in which an activated FT synthesis catalyst obtained by the method of the present invention is suspended in a hydrocarbon (ordinarily, an FT synthetic hydrocarbon produced by the same reactor) which is in a liquid form at the reaction temperature, is housed, and a gas mixture (generally, a synthetic gas obtained by reforming of a hydrocarbon such as a natural gas) of a carbon monoxide gas with a hydrogen gas is introduced to the slurry from the lower part of a reaction column. While the gas mixture ascends in the slurry in a form of a bubble, the gas mixture is dissolved in the hydrocarbon, and when the gas mixture is contacted with the catalyst, a hydrocarbon is generated.

Note that when the FT synthesis catalyst to be used is supplied in a state of an activated FT synthesis catalyst that has been subjected to a stabilization treatment, the FT synthesis catalyst may be directly used. Also in the case of a catalyst subjected to a stabilization treatment by coating with a wax or the like, the wax or the like is dissolved in the hydrocarbon, and the activity of the catalyst is exerted. On the other hand, when a catalyst is supplied in a state where an active metal species contained in the catalyst is an oxide (in a state of a catalyst before subjected to the hydrogen reduction step and the CO reduction step), the catalyst is subjected to the hydrogen reduction step and the CO reduction step in accordance with the method for producing an activated FT synthesis catalyst of the present invention in an FT synthesis reactor or an apparatus attached to the reactor to produce an activated FT synthesis catalyst, and the produced activated FT synthesis catalyst is used for the FT synthesis reaction.

The reaction temperature can be determined depending on the intended carbon monoxide inversion rate, however, it is preferably 150° C. to 300° C., and more preferably 170° C. to 250° C.

The reaction pressure is preferably 0.5 MPa to 5.0 MPa, and more preferably 2.0 MPa to 4.0 MPa. When the reaction pressure is lower than 0.5 MPa, the carbon monoxide inversion rate tends to hardly become 50% or higher, whereas when the reaction pressure is higher than 5.0 MPa, a localized heat generation tends to be easily caused, which is not preferable.

The ratio (molar ratio) of hydrogen/carbon monoxide in a feedstock gas is preferably 0.5 to 4.0, and more preferably 1.0 to 2.5. When the molar ratio is less than 0.5, the reaction temperature becomes high and the catalyst tends to be inactive, whereas when the molar ratio is more than 4.0, the generated amount of methane which is an undesirable by-product tends to increase.

The gas space velocity of the feedstock gas is preferably 500 $h^{-1}$ to 5,000 $h^{-1}$, and more preferably 1,000 $h^{-1}$ to 2,500 $h^{-1}$. When this gas space velocity is lower than 500 $h^{-1}$, the productivity relative to the same catalyst amount is low, whereas when the gas space velocity is higher than 5000 $h^{-1}$, the carbon monoxide inversion rate tends to hardly become 50% or higher, which is not preferable.

By using an activated FT synthesis catalyst produced by the method of the present invention, the catalyst exerts high activity form the initial stage of the reaction, and it is possible to obtain hydrocarbons with a high yield form the initial stage of the reaction.

The present invention is not limited to the aforementioned preferred exemplary embodiments, and to these exemplary embodiments, modifications may be suitably added without departing from the scope of the present invention.

EXAMPLES

Hereinafter, the present invention will be described more specifically with reference to Examples and Comparative Examples, however, the present invention is not limited to the following Examples.

Example 1

Preparation of Catalyst 30 g of a spherel-shaped silica (average pore diameter: 10 nm, average particle diameter: 1.8 mm) was weighed in a 250 ml-glass bottle, and thereto, 100 ml of a nitric acid aqueous solution having a pH value of 6.6 was added, followed by irradiating the mixture with a supersonic wave at 40° C. for 10 minutes. Thereafter, about 50 ml of a supernatant liquid was sucked out of the mixture with a pass tool pipette, 150 ml of an ammonium zirconium carbonate aqueous solution in a concentration of 0.2 mol/L was added thereto, and the mixture was left standing at room temperature for 24 hours. Thereafter, the mixture was filtrated through a filter paper, vacuum-dried at 120° C. for 6 hours, and then calcined in an air atmosphere at 430° C. for 3 hours, thereby obtaining a carrier.

As a metallic cobalt, a cobalt nitrate aqueous solution in an amount equivalent to 20 parts by mass based on 100 parts by mass of the obtained carrier was added to impregnate the carrier with the cobalt nitrate aqueous solution by the Incipient Wetness method. After the impregnation, the mixture was dried at 120° C. for 12 hours, and then calcined at 420° C. for 3 hours, thereby obtaining an unreduced catalyst.

Further, this catalyst was subjected to reduction under a hydrogen stream (hydrogen reduction step) at 450° C. for 7 hours. Thereafter, reduction was continued under a CO stream (CO reduction step) at 300° C. for 3 hours. Thus, an activated FT synthesis catalyst was obtained. Note that a reduction degree of cobalt atoms in the activated FT synthesis catalyst was measured by the above mentioned method after a small amount of the unreduced catalyst was sampled and subjected to the pretreatment (the hydrogen reduction step and the CO reduction step) under the same reduction treatment conditions as described above.

(FT Synthesis Reaction)

5 g of the catalyst that had undergone the above-mentioned treatment was taken out under an inert atmosphere, in a dry box, so as not to be oxidized, and transferred, together with 30 ml of cetane, into an autoclave having an internal volume of 100 ml, and then subjected to the Fischer-Tropsch synthesis reaction in the autoclave. Using a gas mixture having a ratio (molar ratio) of hydrogen to carbon monoxide (hydrogen/carbon monoxide) of 2/1 as a feedstock, the reaction was started under the conditions of W (mass of catalyst)/F (flow rate of synthetic gas)=3 g·h/mol, at a temperature of 230° C., under a pressure of 2.3 MPa, and stirring rate of 1,000 rpm. The gas composition at an outlet of the reaction unit was analyzed with time by gas chromatography, and from the analysis date, the CO inversion rate was calculated. The result is shown in Table 1.

Example 2

An activated FT synthesis catalyst was produced in the same manner as in Example 1 except that the supporting amount of cobalt was changed to 40 parts by mass based on 100 parts by mass of the carrier, and the FT synthesis reaction was performed using this activated FT synthesis catalyst. In addition, the reduction degree of cobalt atoms in the activated FT synthesis catalyst was measured by the same method as in Example 1. The result is shown in Table 1.

Example 3

An activated FT synthesis catalyst was produced in the same manner as in Example 1 except that after the CO reduction step, a stabilization treatment step of lightly oxidizing the outer surface of the carrier was added, and the FT synthesis reaction was performed using this activated FT synthesis catalyst. As the stabilization treatment step, the obtained catalyst after the CO reduction step was charged into a fixed-bed circulation type reaction apparatus and subjected to an oxidization treatment under a stream of 1% by volume-$O_2/N_2$, at 200° C. for 1 hour. In addition, a small amount of the above unreduced catalyst and a small amount of the catalyst that had been subjected to the stabilization treatment were respectively sampled, and then a reduction degree of cobalt atoms in the activated FT synthesis catalyst was measured by the method described above. The result is shown in Table 1.

Example 4

An activated FT synthesis catalyst was produced in the same manner as in Example 1 except that the supporting of the cobalt was changed to the supporting of a ruthenium (supporting amount: 10 parts by mass based on 100 parts by mass of the carrier), and the FT synthesis reaction was performed using this activated FT synthesis catalyst. As a ruthenium precursor, a nitrate was used. In addition, a reduction degree of ruthenium atoms in the activated FT synthesis catalyst was measured by the same method as in Example 1. The result is shown in Table 1.

Comparative Example 1

An activated FT synthesis catalyst was produced in the same manner as in Example 1 except that the reduction time under a hydrogen stream was changed to 10 hours, and the reduction under a CO stream was not performed, and the FT synthesis reaction was performed using this activated FT synthesis catalyst. In addition, a reduction degree of cobalt atoms in the activated FT synthesis catalyst was measured by the same method as in Example 1. The result is shown in Table 1.

Comparative Example 2

An activated FT synthesis catalyst was produced in the same manner as in Example 1 except that the reduction temperature under a CO stream was changed to 180° C., and the FT synthesis reaction was performed using this activated FT synthesis catalyst. In addition, a reduction degree of cobalt atoms in the activated FT synthesis catalyst was measured by the same method as in Example 1. The result is shown in Table 1.

Comparative Example 3

An activated FT synthesis catalyst was produced in the same manner as in Example 1 except that the reduction temperature under a CO stream was changed to 500° C., and the FT synthesis reaction was performed using this activated FT synthesis catalyst. In addition, a reduction degree of cobalt atoms in the activated FT synthesis catalyst was measured by the same method as in Example 1. The result is shown in Table 1.

Comparative Example 4

An activated FT synthesis catalyst was produced in the same manner as in Example 1 except that the supporting amount of cobalt was changed to 2 parts by mass based on 100 parts by mass of the carrier and the reduction time under a CO stream was changed to 20 hours, and then the FT synthesis reaction was performed using this activated FT synthesis catalyst. In addition, a reduction degree of cobalt atoms in the activated FT synthesis catalyst was measured by the same method as in Example 1. The result is shown in Table 1.

Comparative Example 5

An activated FT synthesis catalyst was produced in the same manner as in Example 4 except that the reduction time under a hydrogen stream was changed to 10 hours and the reduction under a CO stream was not performed, and then the FT synthesis reaction was performed using this activated FT synthesis catalyst. In addition, a reduction degree of ruthenium atoms in the activated FT synthesis catalyst was measured by the same method as in Example 1. The result is shown in Table 1.

TABLE 1

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Active metal | Co | Co | Co | Ru | Co | Co | Co | Co | Ru |
| Supporting amount of active metal (part by mass) | 20 | 40 | 20 | 10 | 20 | 20 | 20 | 2 | 10 |
| Reduction degree (mol %) | 94 | 82 | 89 | 90 | 45 | 55 | 98 | 90 | 50 |
| CO inversion rate (%) at initial stage of reaction | 83 | 78 | 80 | 75 | 50 | 55 | 48 | 30 | 53 |

As evident from the results shown in Table 1, it has been shown that when the FT synthesis reaction is performed by the use of the activated FT synthesis catalysts obtained by the production methods of Examples 1 to 4, these catalysts can exert high activity from the initial stage of the FT synthesis reaction and make it possible to obtain high CO inversion rates, as compared to those obtained in Comparative Examples 1 to 5.

INDUSTRIAL APPLICABILITY

As having been described above, when the FT synthesis reaction is performed by the use of an activated FT synthesis catalyst obtained by the production method of the present invention, the catalyst has high activity from the initial stage of the reaction, and thus it is possible to efficiently obtain hydrocarbons with high yields.

The invention claimed is:
1. A method for producing an activated Fischer-Tropsch synthesis catalyst comprising:
   a hydrogen reduction step of subjecting a catalyst comprising 3 parts by mass to 50 parts by mass, as a metal atom, of a cobalt compound and/or a ruthenium compound, based on 100 parts by mass of a carrier containing a porous inorganic oxide, supported on the carrier, to reduction in a gas containing molecular hydrogen at a temperature of 300° C. to 600° C.;
   a CO reduction step of subjecting the catalyst to reduction in a gas containing carbon monoxide and containing no molecular hydrogen at a temperature of 200° C. to 400° C.; and
   a stabilization treatment step of stabilizing the activated catalyst, wherein the stabilization treatment step is provided after both the hydrogen reduction step and the CO reduction step are performed.

2. The method for producing an activated Fischer-Tropsch synthesis catalyst according to claim 1, wherein the CO reduction step is provided after the hydrogen reduction step.

3. The method for producing an activated Fischer-Tropsch synthesis catalyst according to claim 1, wherein the porous inorganic oxide is silica and/or alumina.

4. The method for producing an activated Fischer-Tropsch synthesis catalyst according to claim 1, wherein a reduction degree of cobalt atoms and/or ruthenium atoms in the activated Fischer-Tropsch synthesis catalyst is 70 mol % to 95 mol %.

5. The method for producing an activated Fischer-Tropsch synthesis catalyst according to claim 1, wherein the carrier containing a porous inorganic oxide further contains zirconium.

6. A method for producing hydrocarbons, wherein a feedstock containing carbon monoxide and a hydrogen gas is subjected to Fischer-Tropsch synthesis reaction in the presence of the activated Fischer-Tropsch synthesis catalyst produced by the method according to claim 1.

7. The method for producing an activated Fischer-Tropsch synthesis catalyst according to claim 1, wherein the stabilization treatment step includes coating the outer surface of the activated Fischer-Tropsch synthesis catalyst with a wax.

8. The method for producing an activated Fischer-Tropsch synthesis catalyst according to claim 1, wherein the stabilization treatment step includes oxidizing the outer surface of the activated Fischer-Tropsch synthesis catalyst.

9. The method for producing an activated Fischer-Tropsch synthesis catalyst according to claim 2, wherein the stabilization step includes coating the outer surface of the activated Fischer-Tropsch synthesis catalyst with a wax.

10. The method for producing an activated Fischer-Tropsch synthesis catalyst according to claim 2, wherein the stabilization treatment includes oxidizing the outer surface of the activated Fischer-Tropsch synthesis catalyst.

* * * * *